(12) United States Patent
Yerramalli et al.

(10) Patent No.: US 11,324,050 B2
(45) Date of Patent: May 3, 2022

(54) TWO-STEP RANDOM ACCESS CHANNEL (RACH) PROCEDURE TO FOUR-STEP RACH PROCEDURE FALLBACK

(71) Applicant: QUALCOMM Incorporated, San Diego, CA (US)

(72) Inventors: Srinivas Yerramalli, San Diego, CA (US); Xiaoxia Zhang, San Diego, CA (US); Jing Sun, San Diego, CA (US); Seyed Ali Akbar Fakoorian, San Diego, CA (US); Ozcan Ozturk, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/597,672

(22) Filed: Oct. 9, 2019

(65) Prior Publication Data
US 2020/0120713 A1    Apr. 16, 2020

Related U.S. Application Data

(60) Provisional application No. 62/744,043, filed on Oct. 10, 2018.

(51) Int. Cl.
*H04W 74/08* (2009.01)
*H04L 5/00* (2006.01)
*H04W 24/10* (2009.01)
*H04W 52/34* (2009.01)
*H04W 74/00* (2009.01)

(52) U.S. Cl.
CPC ....... *H04W 74/0833* (2013.01); *H04L 5/0044* (2013.01); *H04W 24/10* (2013.01); *H04W 52/34* (2013.01); *H04W 74/006* (2013.01)

(58) Field of Classification Search
None
See application file for complete search history.

(56) References Cited

U.S. PATENT DOCUMENTS

| 10,314,082 B2 | 6/2019 | Akoum et al. |
| 2017/0034853 A1* | 2/2017 | Rune ....................... H04W 4/70 |
| 2018/0007590 A1* | 1/2018 | Karout ............. H04W 74/0833 |
| 2018/0048375 A1* | 2/2018 | Guo ....................... H04B 7/024 |
| 2018/0110074 A1 | 4/2018 | Akkarakaran et al. |
| 2018/0110075 A1 | 4/2018 | Ly et al. |
| 2018/0198646 A1* | 7/2018 | Gau ...................... H04L 5/0007 |
| 2018/0324853 A1* | 11/2018 | Jeon .................... H04W 74/006 |
| 2019/0075598 A1 | 3/2019 | Li et al. |
| 2019/0104554 A1* | 4/2019 | Amuru ............... H04W 72/042 |

(Continued)

OTHER PUBLICATIONS

ASUSTEK: "Consideration on Fallback of 2-step RACH Procedure", 3GPP Draft, 3GPP TSG-RAN WG2 Meeting #NR Ad Hoc, R2-1700358, 3rd Generation Partnership Project (3GPP), Mobile Competence Centre, 650, Route Des Lucioles, F-06921 Sophia-Anti Polls Cede, vol. RAN WG2, No. Spokane, USA, Jan. 17, 2017, XP051210937, 4 Pages.

(Continued)

*Primary Examiner* — Jutai Kao
(74) *Attorney, Agent, or Firm* — Patterson + Sheridan LLP

(57) ABSTRACT

Certain aspects of the present disclosure provide techniques for random-access channel (RACH) communication. For example, certain aspects provide a method for falling back from a 2-step RACH procedure to a 4-step RACH procedure.

23 Claims, 13 Drawing Sheets

(56) References Cited

U.S. PATENT DOCUMENTS

| | | | | |
|---|---|---|---|---|
| 2019/0357266 | A1* | 11/2019 | Ren | H04W 80/02 |
| 2020/0052803 | A1 | 2/2020 | Deenoo et al. | |
| 2020/0100297 | A1* | 3/2020 | Agiwal | H04W 74/0833 |
| 2020/0107277 | A1* | 4/2020 | Jeon | H04W 52/228 |
| 2020/0267775 | A1* | 8/2020 | Wang | H04W 74/002 |
| 2020/0404711 | A1* | 12/2020 | Zhao | H04W 76/11 |
| 2021/0075574 | A1* | 3/2021 | Jung | H04L 5/0051 |
| 2021/0136827 | A1* | 5/2021 | Xiong | H04L 5/0094 |
| 2021/0227577 | A1* | 7/2021 | Yang | H04L 27/2607 |

OTHER PUBLICATIONS

International Search Report and Written Opinion—PCT/US2019/055680—ISA/EPO—dated Jan. 3, 2020.
SONY: "Considerations on Initial Access Procedures for NR Unlicensed Operations", 3GPP Draft, 3GPP TSG-RAN WG2 Meeting #103bis, R2-1814736_Considerations on Initial Access for NR_U_0.4, 3rd Generation Partnership Project (3GPP), Mobile Competence Centre, 650, Route Des Lucioles, F-06921 Sophia-Antipolis Cedex, F, vol. RAN WG2, No. Chengdu, P.R. China, Oct. 8, 2018-Oct. 12, 2018, Sep. 27, 2018 (Sep. 27, 2018), XP051524125, 4 Pages.
ZTE Corporation, et al., "Msg2 Payload Contents for 2-step RACH", 3GPP Draft, 3GPP TSG-RAN WG2 Meeting#103-bis, R2-1814034, Msg2 Payload Contents for 2-step RACH, 3rd Generation Partnership Project (3GPP), Mobile Competence Centre, 650, Route Des Lucioles, F-06921 Sophia-Anti Polls Cedex, France, vol. RAN NG2, No. Chengdu. China, Oct. 8, 2018-Oct. 12, 2018, Sep. 27, 2018 (Sep. 27, 2018), XP051523495, 9 Pages.

\* cited by examiner

TWO-STEP RANDOM ACCESS CHANNEL (RACH) PROCEDURE TO FOUR-STEP RACH PROCEDURE FALLBACK

CROSS-REFERENCE TO RELATED APPLICATIONS

This patent application claims priority to U.S. Provisional Patent Application No. 62/744,043 filed Oct. 10, 2018, which is assigned to the assignee hereof, is considered part of, and is incorporated by reference in this patent application.

INTRODUCTION

Aspects of the present disclosure relate to wireless communications, and more particularly, random-access channel (RACH) procedures.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is referred to as new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user-equipment (UE). The method generally includes initiating a two-step random access (RA) channel procedure (RACH) by sending a first message to a base station, the first message comprising at least a RACH preamble and a payload, receiving a random access response (RAR) message from the base station, wherein the RAR message indicates successful reception, by the base station, of both the RACH preamble and payload if the response message is of a first format, and transitioning to a four-step RACH procedure before successful completion of the two-step RACH procedure if the RAR message is of a second format.

Certain aspects of the present disclosure provide a method for wireless communication that may be performed by a network entity. The method generally includes sending a random access response (RAR) message to the UE, wherein a first format of the RAR message indicates successful reception of both the RACH preamble and payload and a second format of the RAR message signals the UE to transition to a four-step RACH procedure before successful completion of the two-step RACH procedure.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example telecommunications system, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
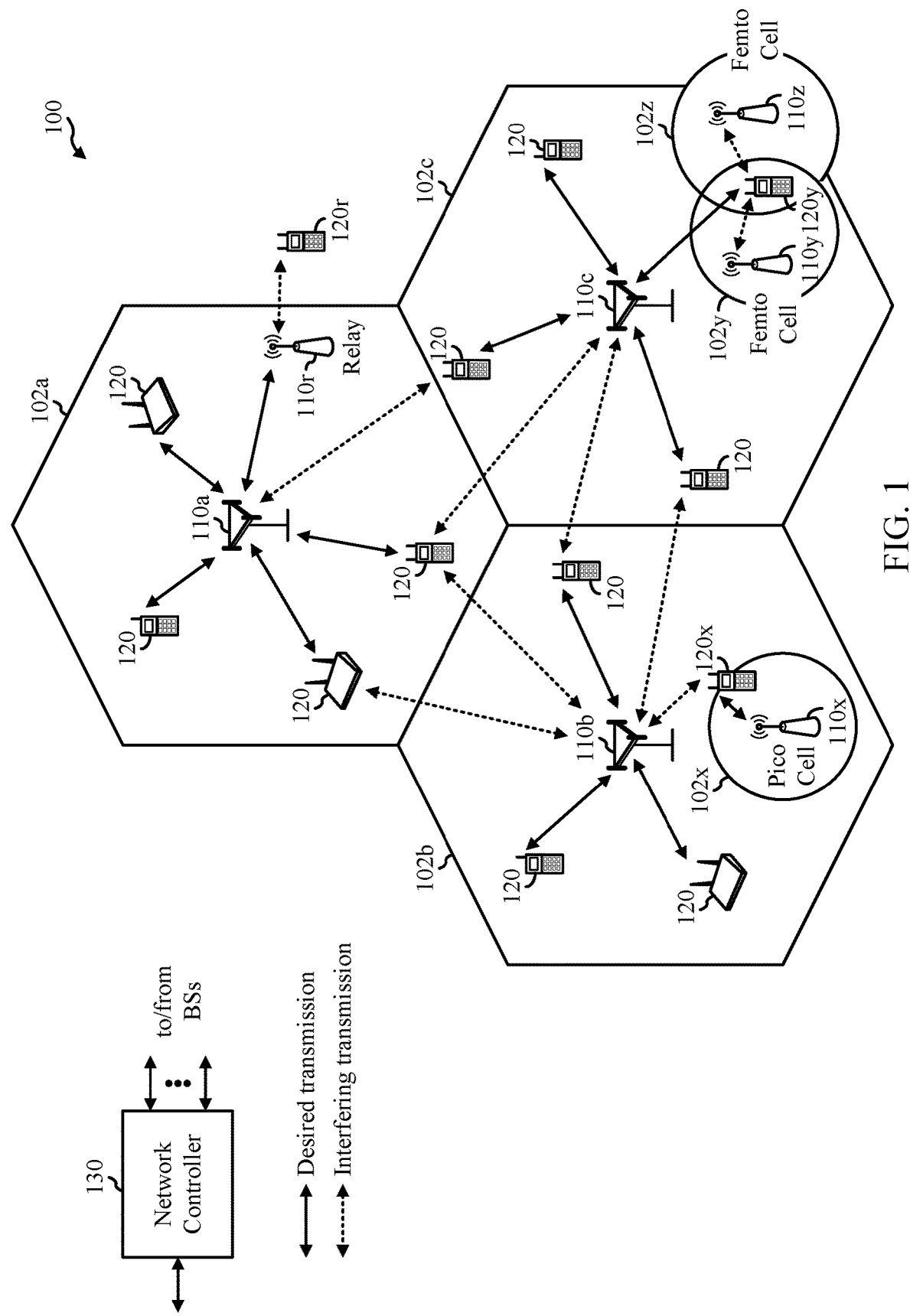

Aspects of the present disclosure provide apparatus, methods, processing systems, and computer readable mediums for random-access channel (RACH) communication.

Certain aspects of the present disclosure may be applied to new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams. As described herein, a BS may monitor active beams using measurements of reference signals (e.g., MRS, CSI-RS, and synch) transmitted via reference beams.

UEs 120 may be configured to perform the operations 1000 and methods described herein for detecting a mobility events based, at least in part, on mobility parameters associated with a beam set. BS 110 may comprise a transmission reception point (TRP), Node B (NB), 5G NB, access point (AP), new radio (NR) BS, etc.). BS 110 may be configured to perform the operations 900 and methods described herein for configuring beam sets and mobility parameters associated with each of the beam sets. The BS may receive an indication of a detected mobility event based on the mobility parameters and may make a decision regarding mobility management of the UE based on the event trigger.

As illustrated in FIG. 1, the wireless network 100 may include a number of BSs 110 and other network entities. ABS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
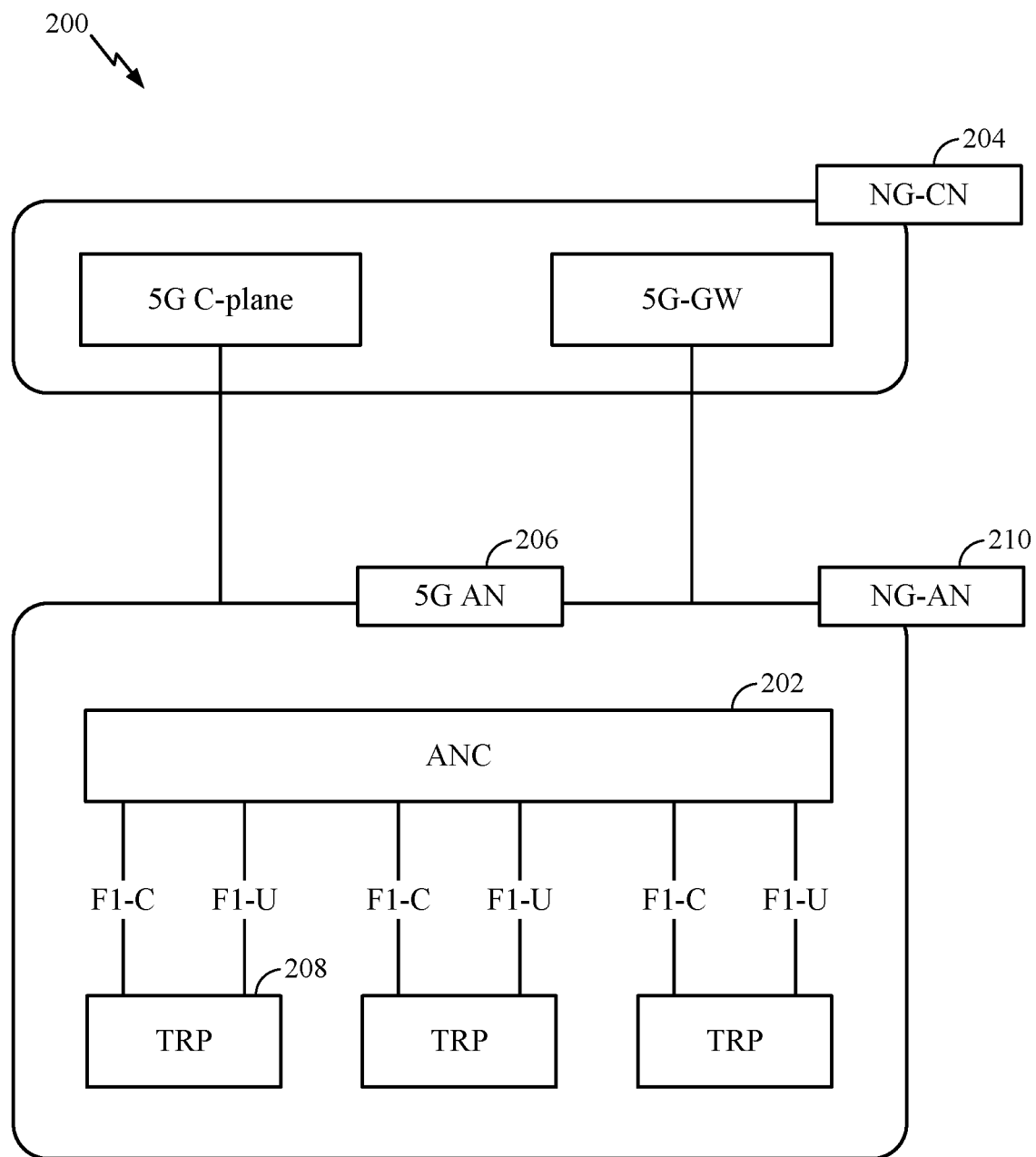
FIG. 2 is a block diagram illustrating an example logical architecture of a distributed RAN, in accordance with certain aspects of the present disclosure.

FIG. 2 illustrates an example logical architecture including a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
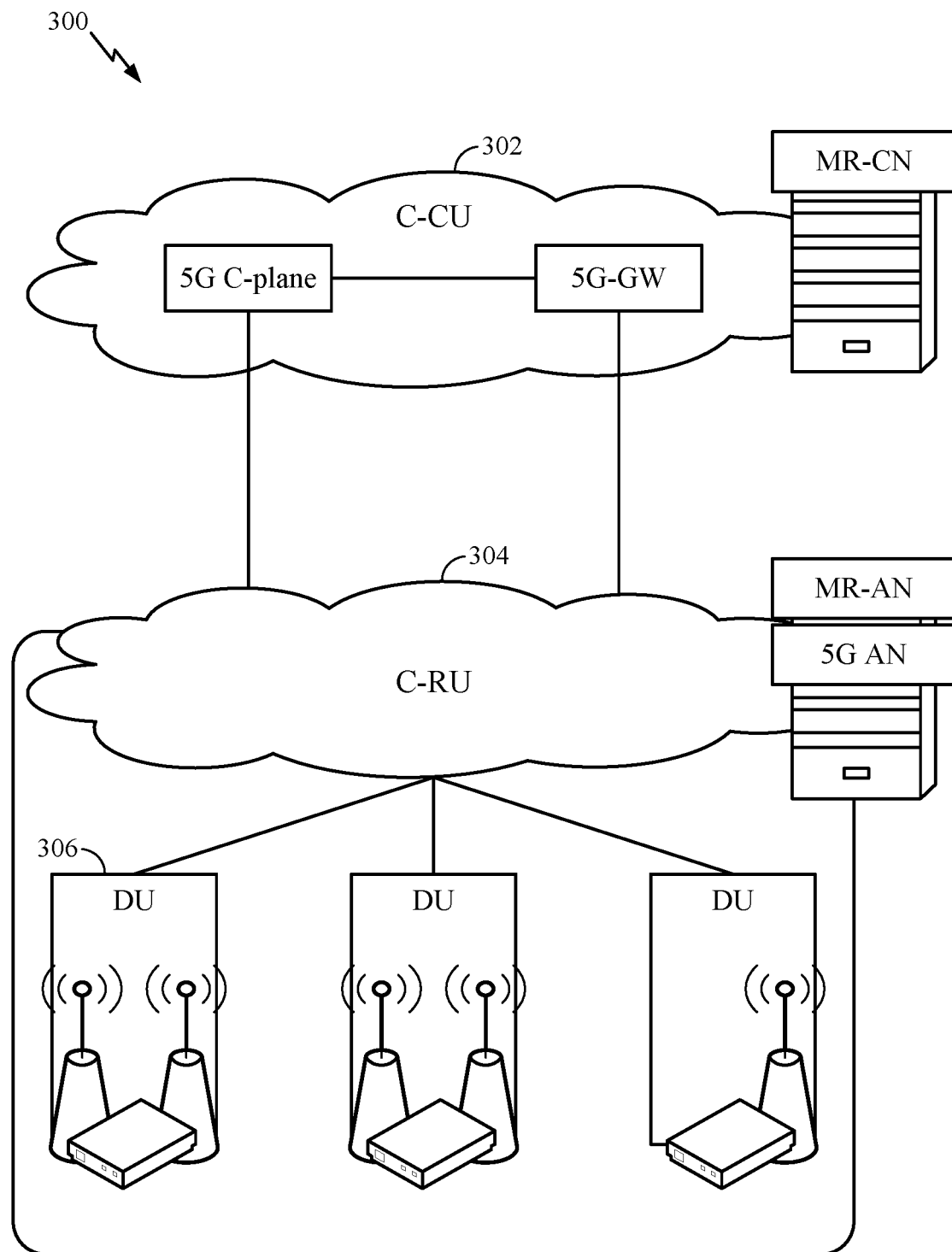
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions or a multi-RAT core network (MR-CN). The C-CU may be centrally deployed. C-CU functionality may be offloaded (e.g., to advanced wireless services (AWS)), in an effort to handle peak capacity.

A centralized RAN unit (C-RU) 304 may host one or more ANC functions of a multi-RAT access node (MR-AN) and/or 5G AN. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
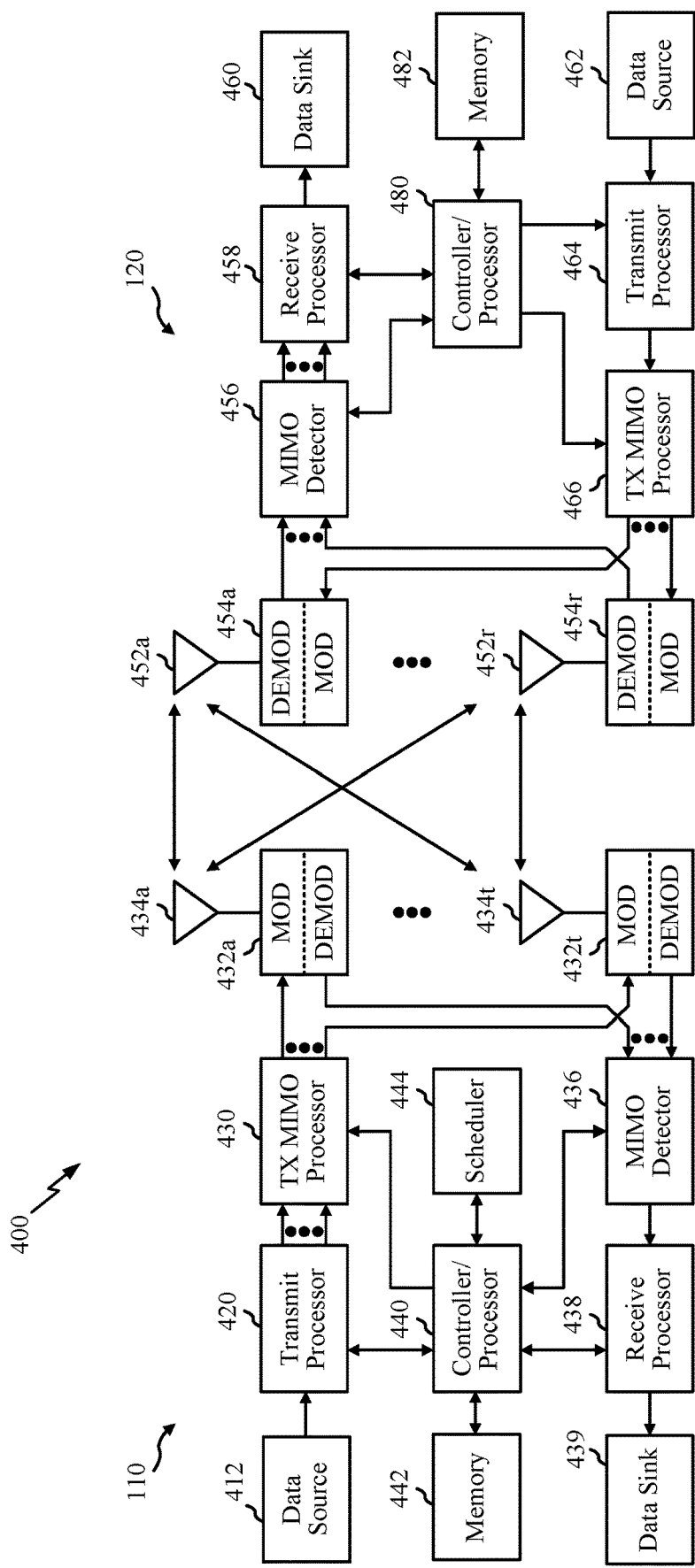
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in various figures, and/or other processes for the techniques described herein. The processor 480 and/or other processors and modules at the UE 120 may also perform or direct, e.g., the execution of the corresponding/complementary processes for the techniques described herein and as illustrated in various figures. The memories 442 and 482 may store data and program codes for the BS 110 and the UE 120, respectively. A scheduler 444 may schedule UEs for data transmission on the downlink and/or uplink.

Figure 5:
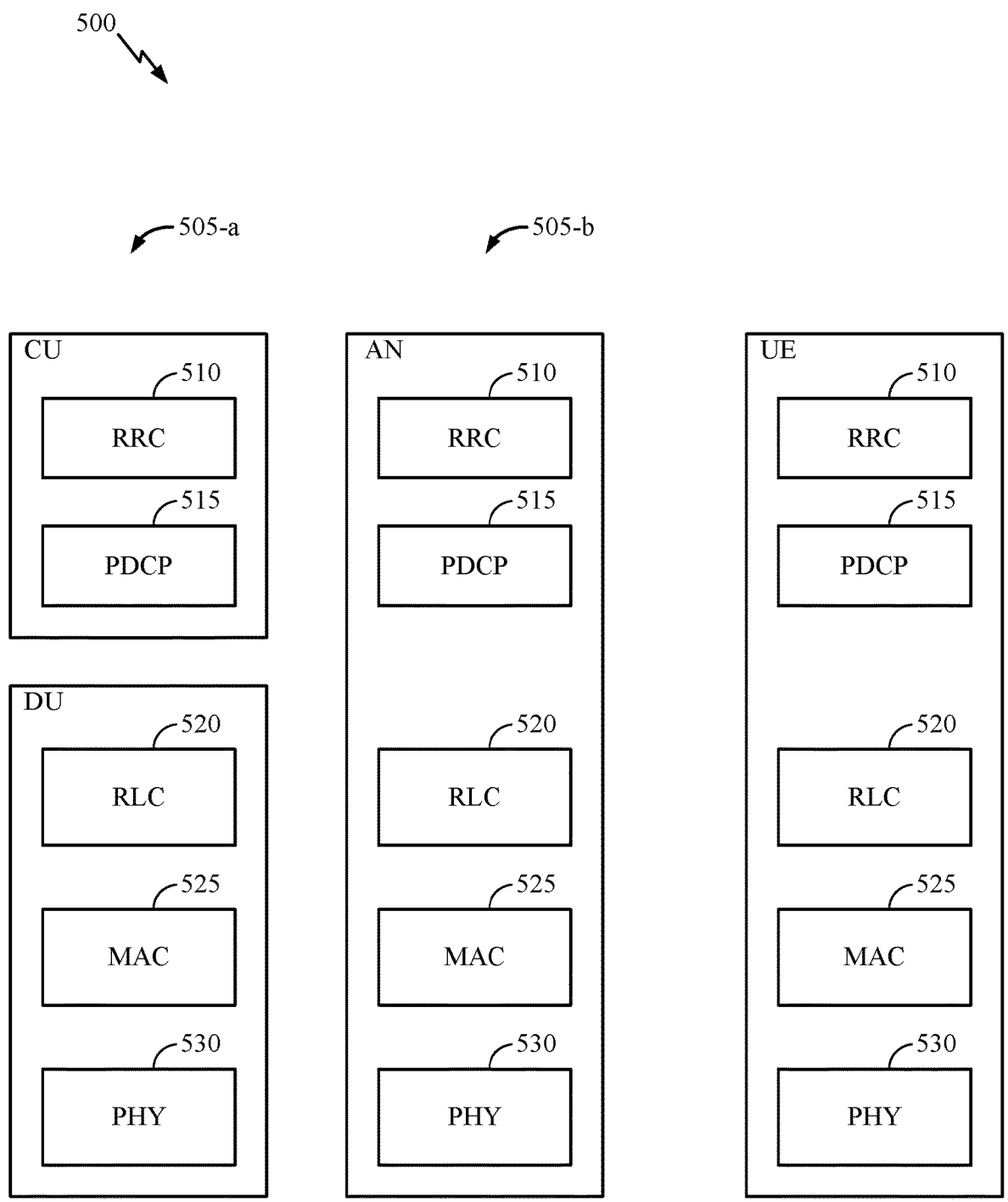
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
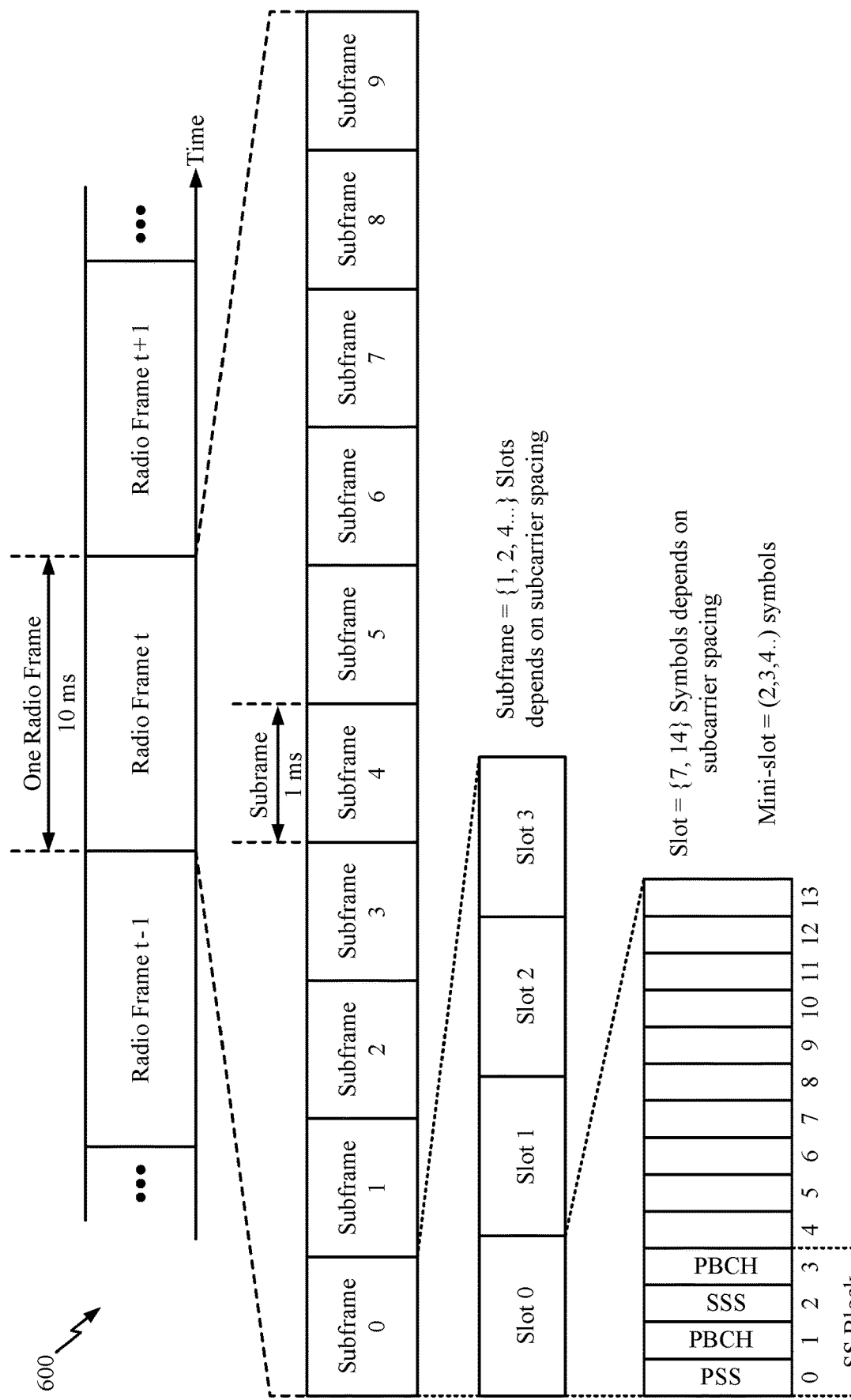
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Random Access Channel (RACH) Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network. Certain aspects of the present disclosure provide multiple RACH procedures and techniques for selecting a RACH procedure for communication.

Figure 7:
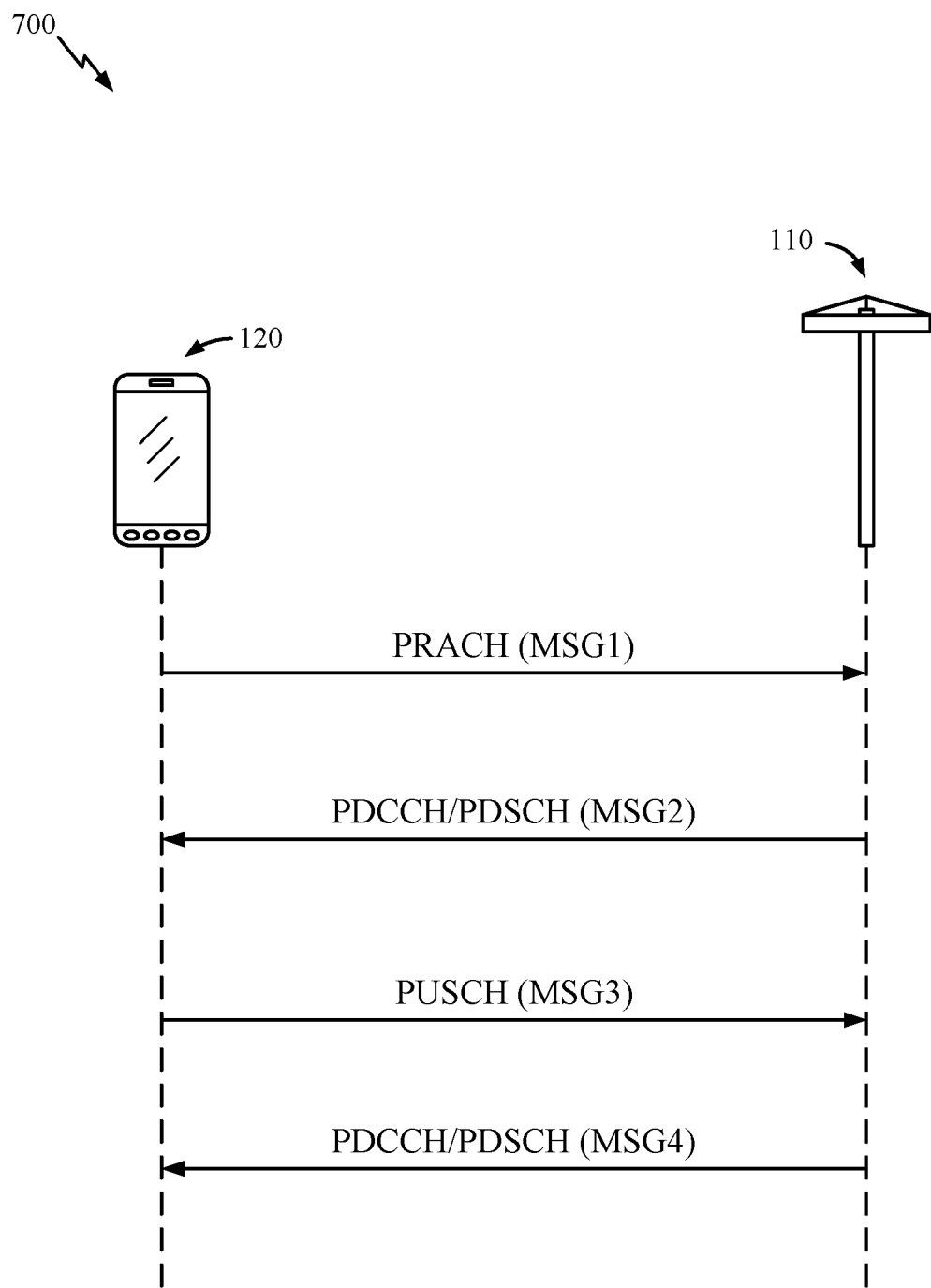
FIG. 7 illustrates a call-flow diagram for an example four-step random-access channel (RACH) procedure, in accordance with certain aspects of the present disclosure.

FIG. 7 is a timing (or "call-flow") diagram 700 illustrating an example four-step RACH procedure, in accordance with certain aspects of the present disclosure. A first message (MSG1) may be sent from the UE 120 to eNB 110 on the physical random access channel (PRACH). In this case, MSG1 may only include a RACH preamble. eNB 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to eNB 110 on the PUSCH. MSG3 may include a RRC connection request, a tracking area update, and a scheduling request. The eNB 110 then responds with MSG 4 which may include a contention resolution message.

In some cases, to speed access, a two-step RACH procedure may be supported. As the name implies, the two-step RACH procedure may effectively "collapse" the four messages of the four-step RACH procedure into two messages.

Figure 8:
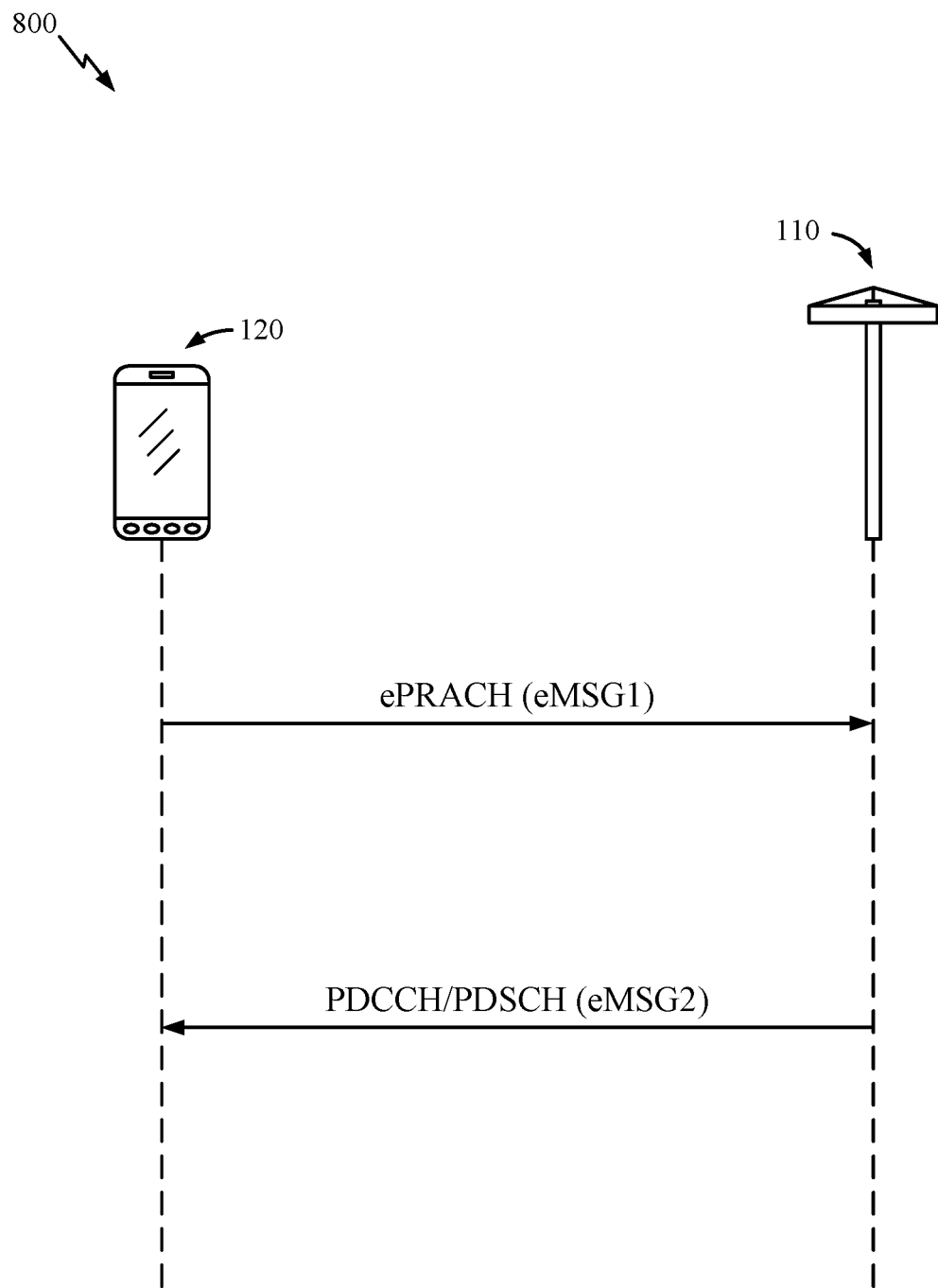
FIG. 8 illustrates a call-flow diagram for an example two-step RACH procedure, in accordance with certain aspects of the present disclosure.

FIG. 8 is a timing diagram 800 illustrating an example two-step RACH procedure, in accordance with certain aspects of the present disclosure. A first enhanced message (eMSG1) may be sent from the UE 120 to eNB 110. In this case, eMSG1 may include a RACH preamble for random access and a payload. The eMSG1 payload, for example, may include the UE-ID and other signaling information (e.g., buffer status report (BSR)) or scheduling request (SR). eNB 110 may respond with a random access response (RAR) message (eMSG2) which may effectively combine MSG2 and MSG4 described above. For example, eMSG2 may include the ID of the RACH preamble, a timing advance (TA), a back off indicator, a contention resolution messages, UL/DL grant, and a transmit power control (TPC) commands.

Example Fallback from 2-Step to 4-Step RACH Procedure

Certain aspects of the present disclosure are generally directed to procedures for transitioning ("falling back") from performing a two-step RACH procedure to a four-step RACH procedure.

Figure 9:
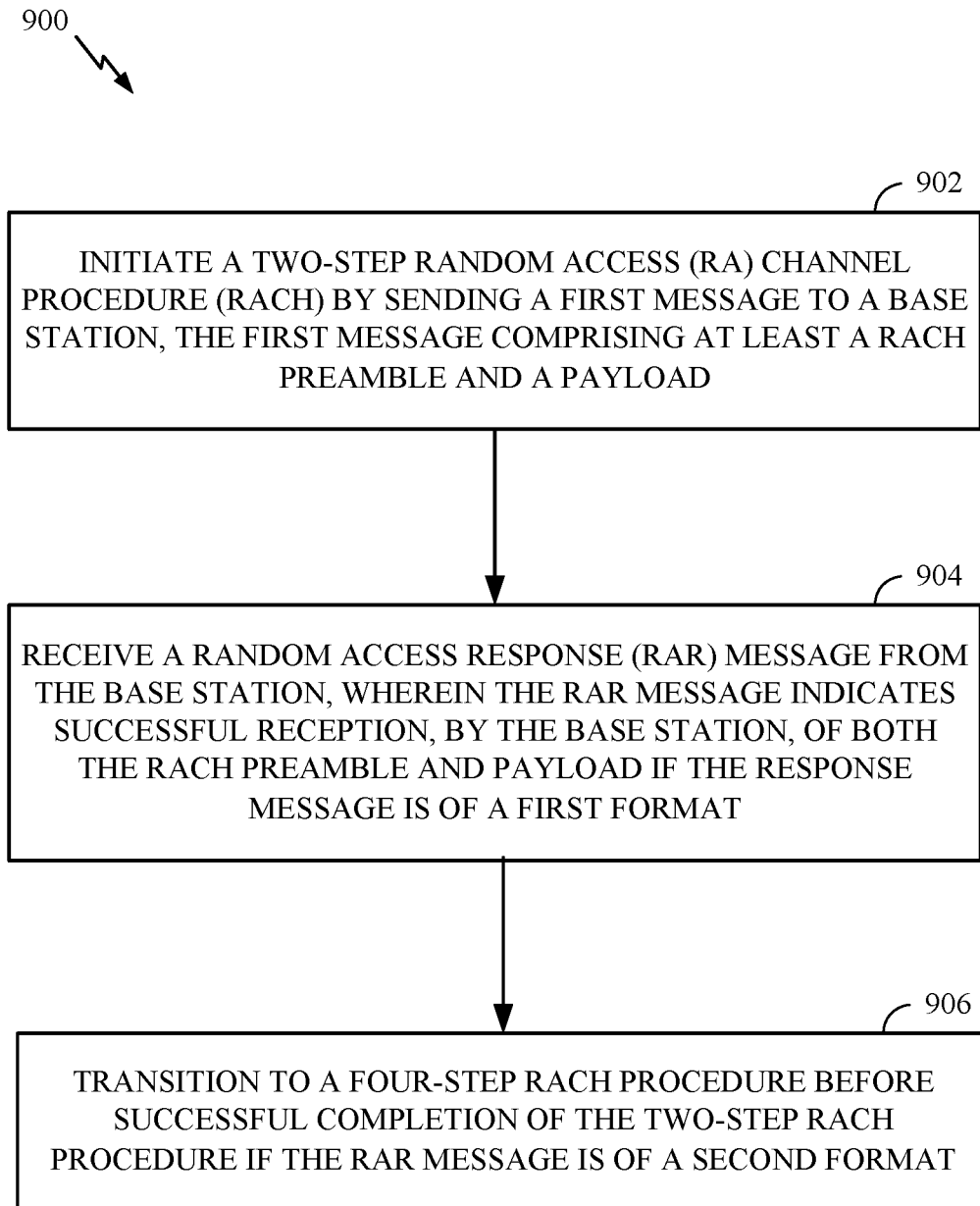
FIG. 9 illustrates example operations for wireless communication by a user equipment (UE), in accordance with certain aspects of the present disclosure.

A UE may fall back from a 2-step RACH procedure to a 4-step RACH procedure in a number of different scenarios. For example, a 2-step RACH procedure may not succeed due to a path loss and larger timing advance (TA). As another example, a gNB may only detect a preamble of the enhanced MSG1, but not the payload portion when a UE starts in the 2-step RACH procedure. In this case, the UE may continue the RACH procedure with 4-step FIG. 9 illustrates example operations 900 that may be performed by a UE as part of a RACH procedure, in accordance with certain aspects of the present disclosure. Operations 1000 may be performed, for example, by a UE such as the UE 120 (or one or more of the processors thereof shown in FIG. 4).

Operations 900 begin, at 902, by initiating a two-step random access channel procedure (RACH) by sending a first message to a base station, the first message comprising at least a RACH preamble and a payload. At 904, the UE receiving a random access response (RAR) message from the base station, wherein the RAR message indicates successful reception, by the base station, of both the RACH preamble and payload if the response message is of a first format. At 906, the UE transitions to a four-step RACH procedure before successful completion of the two-step RACH procedure if the RAR message is of a second format.

Figure 10:
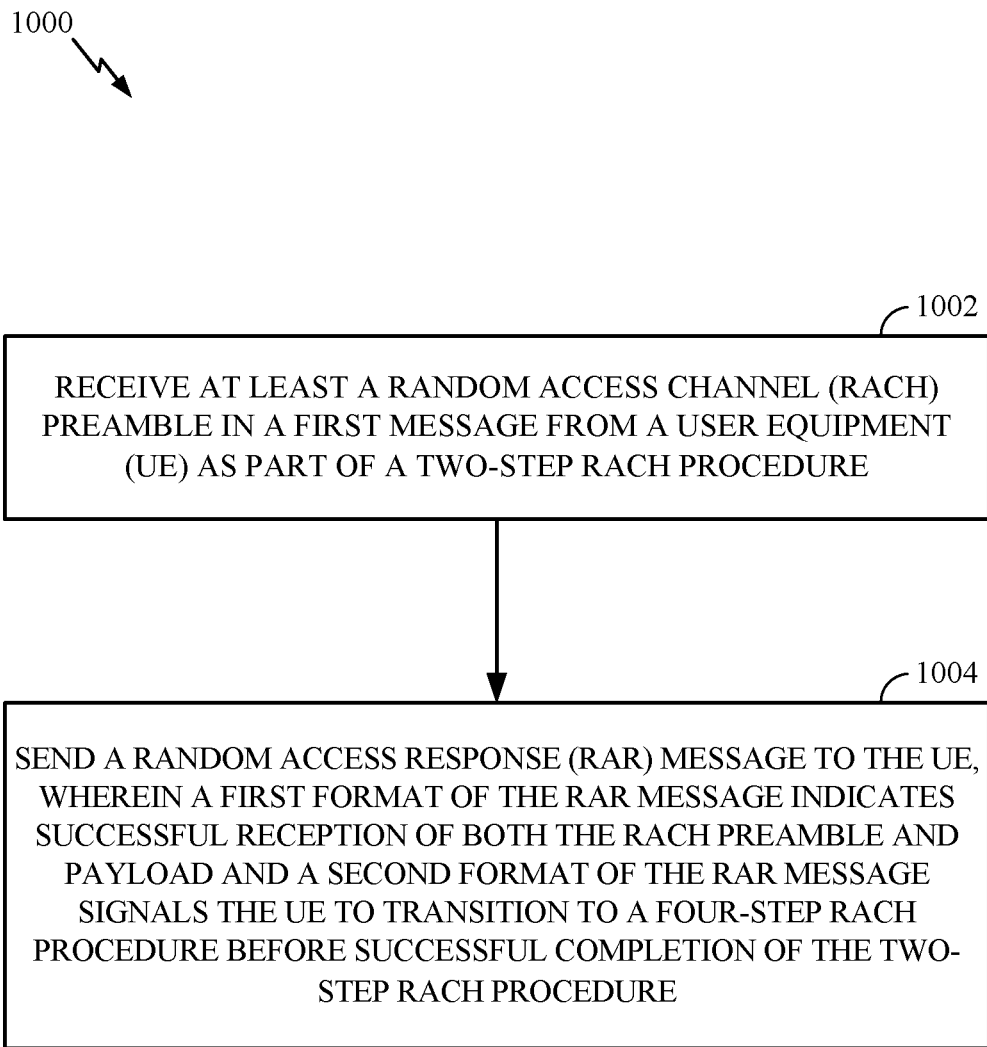
FIG. 10 illustrates example operations for wireless communication by a network entity, in accordance with certain aspects of the present disclosure.

FIG. 10 illustrates example operations 1000 that may be performed by a network entity as part of a RACH procedure, in accordance with certain aspects of the present disclosure. Operations 1000 may be performed by an eNB such as the eNB 110 (or one or more of the processors thereof shown in FIG. 4) participating in a RACH procedure with a UE performing operations 900 described above.

Operations 1000 begin, at 1002, by receiving at least a random access channel (RACH) preamble in a first message from a user equipment (UE) as part of a two-step RACH procedure. At 1004, the network entity sends a random access response (RAR) message to the UE, wherein a first format of the RAR message indicates successful reception of both the RACH preamble and payload and a second format of the RAR message signals the UE to transition to a four-step RACH procedure before successful completion of the two-step RACH procedure.

Various alternatives are provided herein for fallback from a 2-step RACH procedure to a 4-step RACH procedure. A first alternative (Alt 1) may be referred to a as a hard fallback, where the UE starts with 2-step RACH procedure and finishes the entire procedure (including all power ramping) but still fails to access communication resources. After this failure, the UE moves to a 4-step RACH procedure from an initial 4-step RACH power level.

Figure 11:
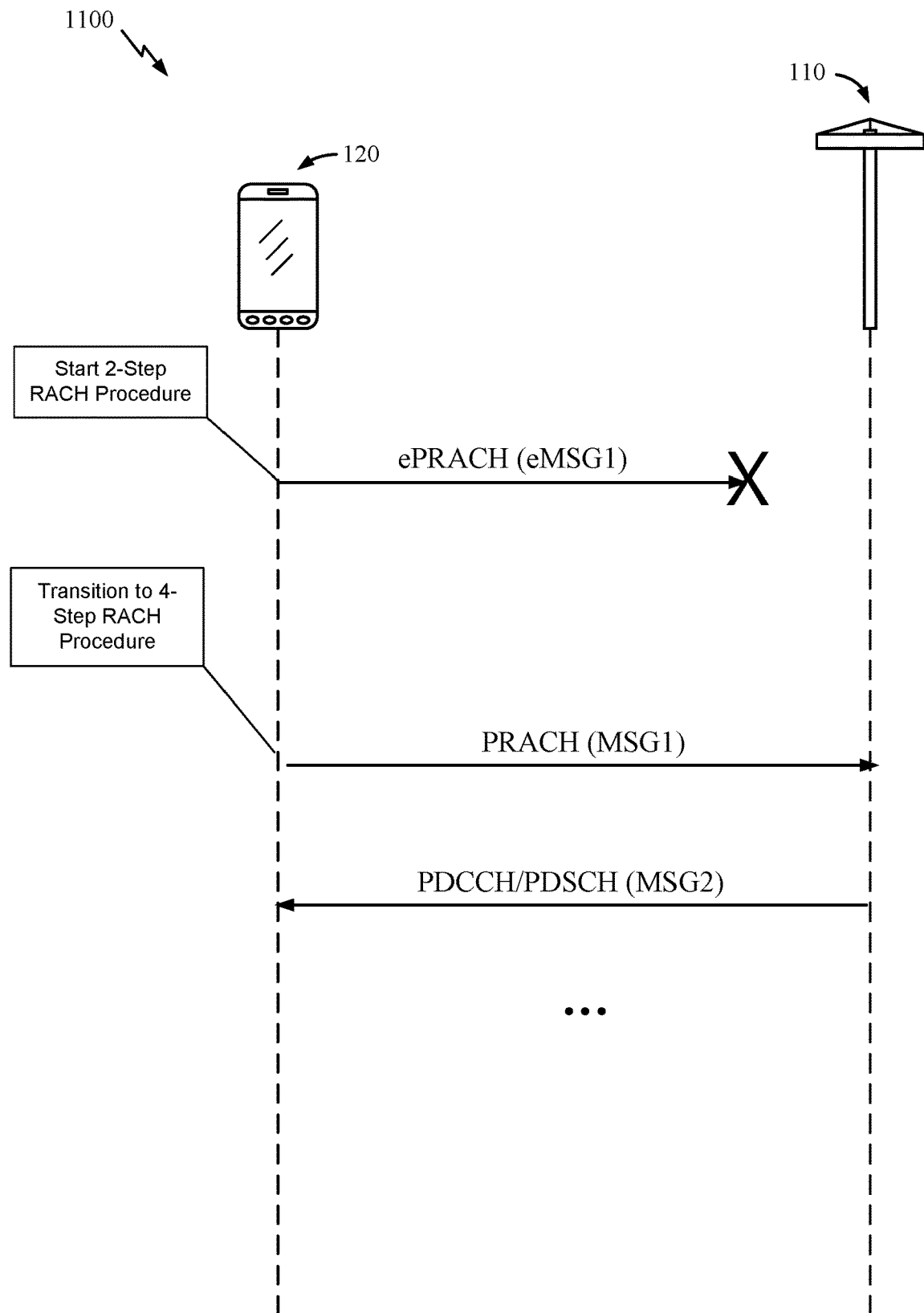
FIGS. 11-13 illustrate call-flow diagrams for example procedures to fallback from a two-step RACH procedure to a four-step RACH procedure, in accordance with certain aspects of the present disclosure.

This hard fallback, illustrated in FIG. 11, may be contrasted by other alternative fallback procedures where the UE starts with a 2-step RACH procedure and, somewhere in the middle of the 2-step RACH procedure (i.e. the RACH procedure has not yet finished), the UE moves to a 4-step RACH procedure. As will be described in greater detail below, the decision to transition to the 4-step RACH procedure may be made autonomously by the UE or may be triggered by signaling from the gNB (e.g., with a new MSG2 format).

The hard fallback may be considered a relatively straightforward solution, as the two-step and four-step RACH procedures are not integrated. In this case, the gNB will simply not respond if the new MSG1 preamble is detected but the UE-ID is not detected. As the two-step RACH procedure is allowed to play out, performance of the hard fallback alternative may not be optimum (e.g. due to access delay, extra interference introduced, etc.), but the procedure may be relatively simple to implement with minimum gNB involvement.

Even with the hard fallback, the gNB may have some control by configuring the maximum number of attempts that the UE can try in the 2-step PRACH before falling back to the 4-step RACH procedure.

In the case of fallback (whether hard fallback or the "softer" alternatives described below) from 2-step to 4-step, there are various options for selecting the transmit (Tx) power level for the UE to start the 4-step RACH.

For example, according to a first option for selecting the Tx power level, the UE starts with the Tx power level based on a configured transmit power control parameter (e.g., preambleReceivedTargetPower) for 4-step RACH, the value of which may be configured differently compared to a similar parameter for 2-step RACH. In other words, the UE may have separate open loop power control parameters for 2-step and 4-step RACH procedures. In some cases, the power ramping step size may also be configured differently between 2-step and 4-step RACH procedures.

According to a second option for selecting the Tx power level, the UE may resume from the current Tx power level (from the 2-step RACH) when starting the 4-step RACH procedure. According to a third option for selecting the Tx power level, the UE may resume from the current Tx power level when starting the 4-step RACH procedure and also apply additional power ramping.

A second alternative for fallback operation may be referred to as an integrated fallback operation as this procedure effectively integrates the 2-step and 4-step RACH procedures. In this alternative, the UE (autonomously) makes the decision to fall back in the middle of the 2-step RACH procedure (e.g., the gNB may still not be involved). In some cases, the UE may alternate between 2-step RACH and 4-step RACH for the same power level, and then move to the next power level (and again alternate between 2-step RACH and 4-step RACH). In other cases, the UE may attempt 2-step RACH a number of times at different power levels before switching to 4-step RACH a number of times at different power levels. These approaches may be beneficial as the UE may have different 2-step RACH or 4-step RACH experiences, depending on the Tx power so it may be beneficial for the UE to try the different RACH procedures for each power level. As described above, other options for selecting the Tx power level may be used. For example, the UE may resume from a Tx power level between the 2-step RACH and 4-step RACH without additional power ramping, or use additional power ramping even when changing from 2-step to 4-step RACH or vice versa.

A third alternative for fallback operation may be referred to as a gNB assisted fallback procedure. In this case, the gNB can assist the fallback when UE sends new MSG1, and gNB detects the preamble but not the payload (UE-ID). Having detected the preamble, it may be desirable to fall back to the 4-step RACH procedure as the UE does not need to send preamble again. Thus, the UE-ID transmission (which was included in the payload of the 2-step MSG1) can be moved out of the PRACH resource to avoid collision.

In some cases, the gNB may trigger the fallback to the 4-step RACH procedure via a new format for MSG2. For example, a first (conventional 2-step RACH) format of MSG2 may be used to confirm reception of new MSG1. This format may include RA preamble identifier (RAPID), TA, C-RNTI, UE ID.

Figure 12:
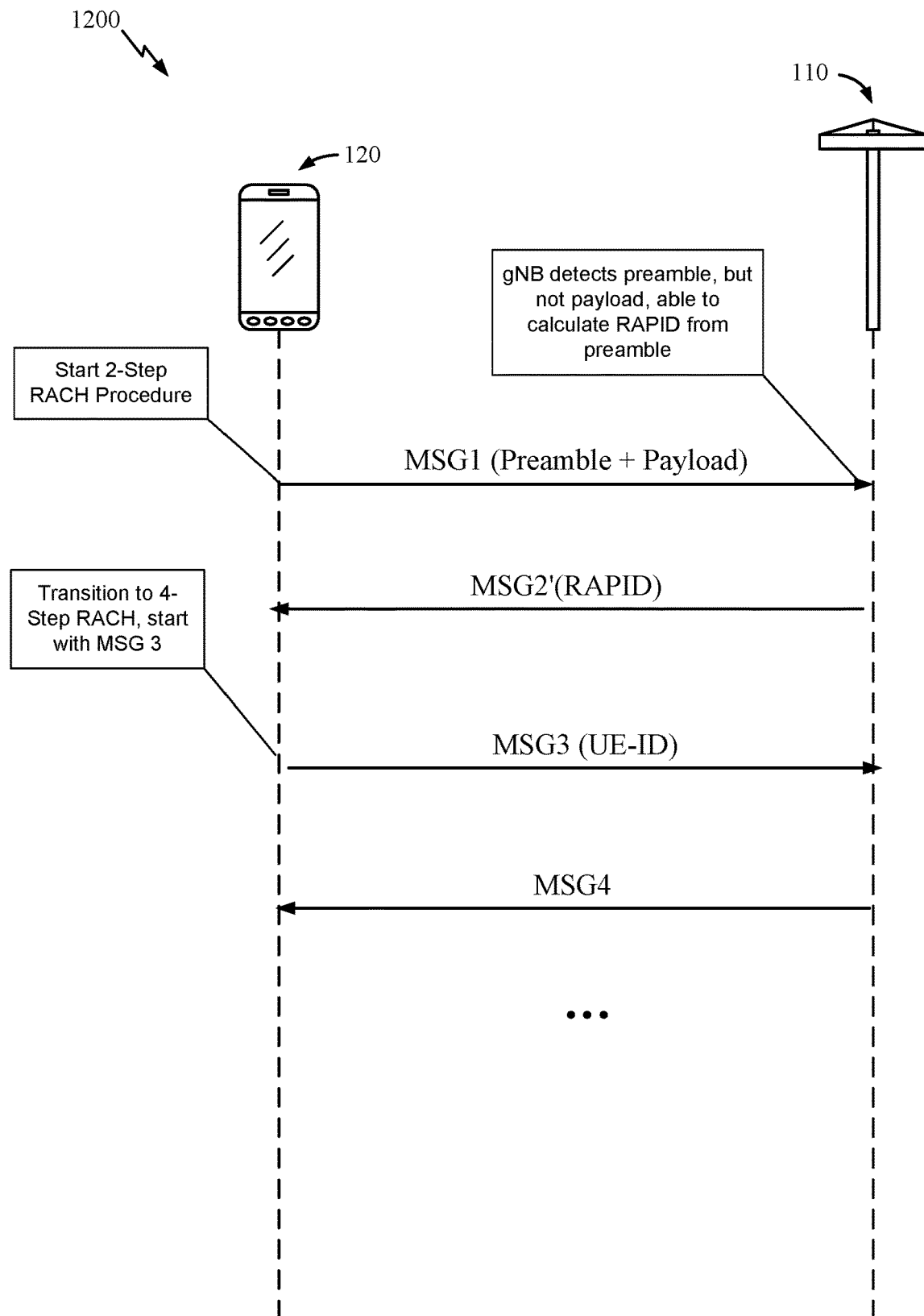

As illustrated in FIG. 12, a second (new) format "MSG2" may be designed to trigger fallback and may include at least the same field as legacy MSG2, including RAPID, TA, TC-RNTI, and UL grant. Various options for a new format MSG2 are described in greater detail below. In any case, a UE may identify the format of the new MSG2 and may check the RAPID/UE-ID (to the preamble it sent in MSG1). If the new MSG2 is the fallback format and has the right RAPID, the UE may assume the gNB detected the preamble portion of the 2-step MSG1 and may, thus, start the 4-step RACH procedure by transmitting MSG3 with UE-ID.

In some cases, if a MSG2 is sent via a PDCCH that contains a hash of the preamble and UE-ID, there may be a challenge to trigger fallback if the gNB failed to decode UE-ID in new MSG1. To address this, a default UE-ID (or special UE-ID/reserved UE-ID such as all '0s') may be used for MSG2. In this case, if the UE decodes PDCCH with RA-RNTI and compare the hashed ID field with the one generated by preamble+UE-ID and preamble+default UE-ID, then the UE may know to attempt PDSCH decoding if either of these two matches the received hashed ID field. Accordingly, there may still be a hashing collision and the collision probability increases with a check of two candidates. In any case, after successful decoding of the PDSCH, the UE will identify the format of new MSG2. If the MSG2 is the new format, the UE will check with the RAPID to see if it is for itself, instead of a collision and proceed to fallback to 4-step RACH.

Figure 13:
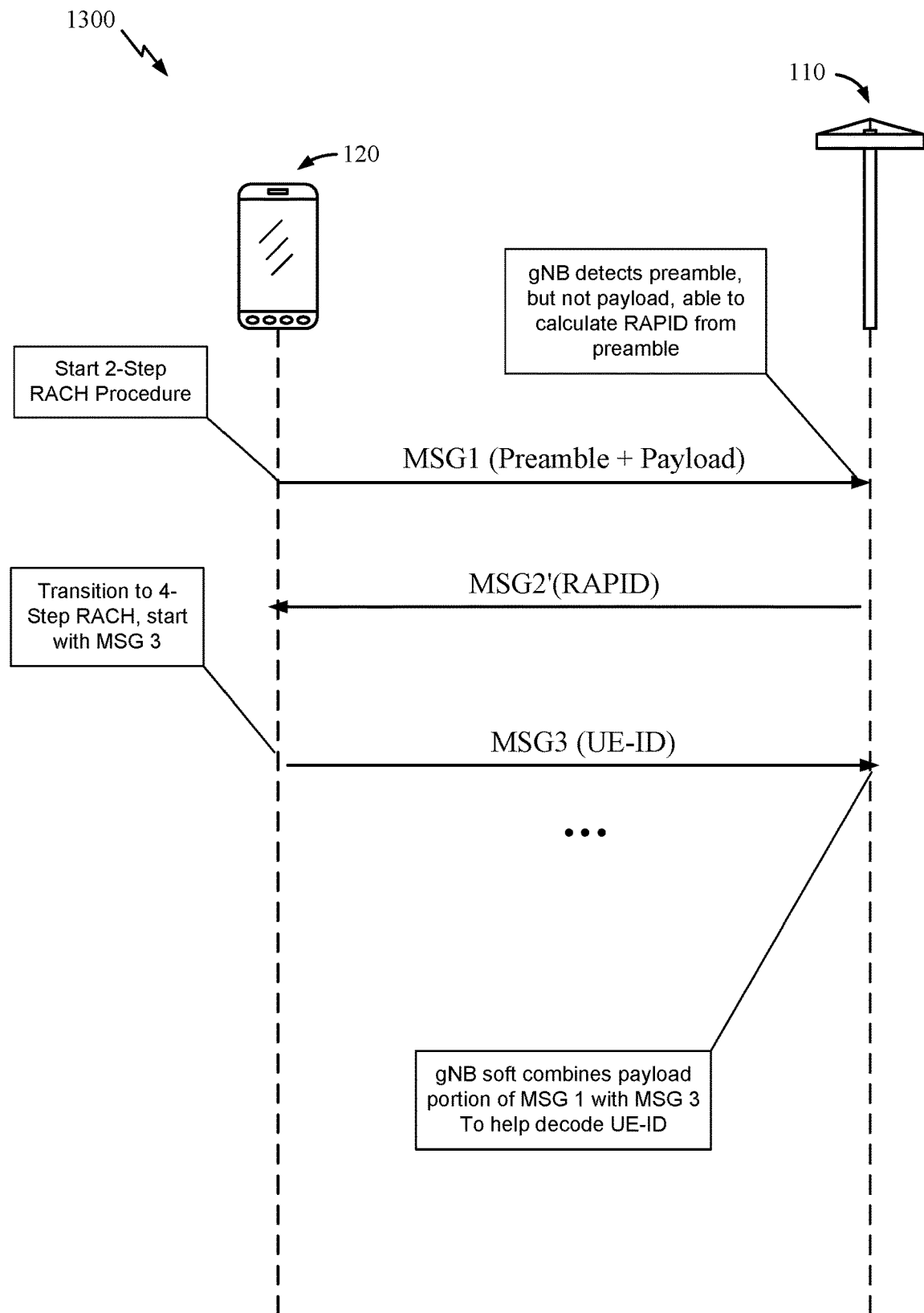

As illustrated in FIG. 13, in some cases, a gNB may take advantage of soft combining of UE-ID decoding (from the 2-step MSG1) for MSG3 transmission decoding in fallback. As noted above, in fallback, MSG3 transmission may be triggered by a new MSG2 format with an UL grant. The gNB may support some level of soft combining of the payload/data portion of new (2-step RACH) MSG1 and the granted transmission of MSG3 during fallback to the 4-step RACH procedure.

When the payload of MSG1 is sent on PUSCH, it is possible for the gNB to combine the MSG3 with the earlier transmitted payload (with LLR combining). In some cases, both transmissions in (2-step) MSG1 and the fallback MSG3 may be encoded via an LDPC code. In some cases, when the MSG3 transmission is triggered, the TBS calculation may use a special rule (e.g., the payload may be fixed to be the UE-ID length, instead of zero padding to the TBS calculated from the grant).

When the payload of MSG1 is sent on PUCCH, due to the different encoding of PUCCH and MSG3 (i.e. PUCCH may be encoded using a Polar code whereas MSG3 may be encoded using LDPC code), soft combining may not be possible. Alternatively, the UL grant may grant a PUCCH transmission to enable possible combining (e.g., so that the MSG3 transmission uses a Polar code as well). As an alternative, the PUSCH for triggered MSG3 transmission may be made special (e.g., and use a Polar code instead of LDPC).

Various information, such as RACH configuration information, is often conveyed via remaining minimum system information (RMSI) broadcast transmissions. In some cases, RMSI configuration information may be provided to support the fallback from two-step to four-step RACH procedures. For example, RMSI may convey various parameters such as the 2-step and 4-step threshold, power ramping step size, maximum number of attempts, and/or different PRACH received power (strictly TDM or interleaved, how to compute the timer, how to do power ramping when UE switches between 2-step and 4-step RACH, how to count the # of attempts).

In addition to the preamble and payload resource association indication, gNB may indicate additional information in RMSI. For example, RMSI may configure a different RSRP-Threshold for 2-step and 4-step RACH procedures, a different preambleReceivedTargetPower for 2-step and 4-step RACH procedures, a different preambleTransMax separately for 2-step and 4-step RACH or preambleTransMax includes total attempts with both 2-step and 4-step RACH, different powerRampingStep for 2-step and 4-step RACH, and/or different BACKOFF Indicator for 2-step and 4-step RACH.

In some cases, the UE may be allowed to choose between 2-step and 4-step RACH procedure based on its listen-before-talk (LBT) load/channel occupancy measurement. For example, if the LBT load is high and UE transmission may have a higher chance of being gated by LBT, the UE may choose the 2-step even if the RSRP-Threshold would dictate that the UE perform the 4-step RACH procedure.

There are various options for applying a transmit power offset (e.g., delta_msg3) for the 2-step and/or 4-step RACH procedure. According to a first option, the power offset (delta_msg3) is applied to new MSG1 payload in 2-step procedure. This may include the new MSG1 payload with or without embedded DMRS. When the new MSG1 payload uses the preamble as the DMRS, the delta_msg3 may be applied to the payload transmission. When a new MSG1 payload uses its own embedded DMRS, the delta_msg3 may be applied to the payload as well as the embedded DMRS transmission.

According to another option, the delta_msg3 may only be applied to the MSG3 when 2-step falls back to 4-step. The same Tx power spectrum density (PSD) may be used between preamble and the payload transmission in new MSG1. In other words, the new MSG1 may apply the delta_msg3 on top of the payload (+potentially embedded DMRS). In addition, when UE falls back to MSG3 transmission with the 4-step RACH procedure, the additional delta_msg3 may be applied on top of the payload sent in the new MSG1. These two options for applying a transmit power offset may also be combined and an additional transmit power control (TPC) field can be in addition to either of these options.

In NR, for contention-based random access (CBRA), the subcarrier spacing (SCS) for MSG3 is configured in the RACH configuration (RMSI) separately from SCS for MSG1 (e.g., via 1-bit). In addition, the network signals the waveform for MSG3 in the RMSI as one bit (e.g., the waveform for MSG3 can be DFT-S-OFDM or CP-OFDM).

In some cases, a UE may be allowed to use different SCS for preamble and payload with new MSG1. According to a first option, the UE may be allowed to use different SCS for preamble and payload and can follow the current SCS for 4-step indication. According to a second option, the same SCS may be used for preamble and payload for the new MSG1. With this option, the SCS can follow current MSG1 or MSG3 in 4-step procedure or it can be separately indicated for the new MSG1 with 2-step procedure.

In some cases, the new 2-step RACH Msg1 may be used for contention free random access (CFRA). In some cases, the new Msg1 may be used at least for CFRA based handover, where the UE needs to send UL Msg. Conventionally, the UL msg is sent based on the UL grant issued in Msg2. In this case, it may be beneficial to attach the payload in the new Msg1 even for CFRA. In some cases, the gNB can indicate whether UE sends preamble only or new Msg1 for CFRA. As noted above, there are various options for a new MSG2 design to allow a gNB to trigger fallback from the 2-step to the 4-step RACH procedure. In Rel.15 NR 4-step RACH, a RA-RNTI associated with the PRACH in which the Random Access Preamble is transmitted, is computed as:

$$RA\text{-}RNTI=1+s\_id+14 \times t\_id+14 \times 80 \times f\_id+14 \times 80 \times 8 \times ul\_carrier\_id$$

where s_id is the index of the first OFDM symbol of the specified PRACH (0≤s_id<14), t_id is the index of the first slot of the specified PRACH in a system frame (0≤t_id<80), f_id is the index of the specified PRACH in the frequency domain (0≤f_id<8), and ul_carrier_id is the UL carrier used for MSG1 transmission (0 for a normal uplink (NUL) carrier, and 1 for a supplementary uplink (SUL) carrier).

In some cases, the new MSG2 may use a similar RA-RNTI design. For example, there may be one new MSG2 per PDSCH or the multiplexing of MSG2 of different UEs in PDSCH may be supported. Retransmission of new MSG2s may be supported, and similarly, ACK/NAK for reception of new MSG2 may also be supported.

According to a first option, the New MSG2 may be broadcast to group of UEs with a same RA-RNTI. In this case, the new MSG2 of multiple UEs is multiplexed together into one PDSCH, for example, with DCI whose CRC is scrambled by RA-RNTI. For PDCCH, the MSG2 format may be based on the structure of a normal DL grant. Because of the multiplexing nature of the payload, there may be no support for HARQ feedback as the UE does not know if there is a new MSG2 for itself before decoding. There may be a need for TB scaling of the legacy MSG2 grant due to a lack of retransmission. HARQ process ID, NDI, RVID are not needed because there are no retransmissions and the space could be used for TB scaling.

For PDSCH, MAC layer multiplexing of multiple new MSG2s for different UEs may be used. The gNB may include RAPID, TA, C-RNTI and UE ID, and the like, in the new MSG2. However, the gNB may not be aware of whether a UE receives MSG2 correctly or not without feedback. Therefore, the gNB may opportunistically include an UL grant in new MSG2 for a UE to send a Msg 5 (RRC confirmation). The detection of the granted UL transmission may also serve as confirmation that the UE has received the new MSG2.

According to a second option, the new MSG2 broadcasts to group of UEs with same RA-RNTI, but with ACK/NAK feedback and retransmission. The PDCCH may still be CRC scrambled by RA-RNTI, but NDI and RVID fields may be needed for retransmission support. ARI can be included as well) to be combined with per new MSG2 ARI to come up with a combined ARI for ACK transmission. HARQ process IDs can be included to allow multiple PDSCH with different new MSG2 contents: one set of new MSG2 under retransmission, while another set of new MSG2 initiated. This may require the UE to decode multiple broadcast (RA-RNTI) PDSCH though.

For PDSCH with this option, the gNB may include RAPID, TA, C-RNTI and UE ID etc. in new MSG2. In addition, the gNB may include per new MSG2 ARI to indicate separate ACK/NAK feedback resources for each individual RAPID. In this case, a UE with successful contention resolution may send ACK on the corresponding resources. NACK is not transmitted. Only if UE decoded the PDSCH, it will know there is a new MSG2 for itself. In this way, the contention resolution may be determined without UL Msg5 transmission. For retransmission, the gNB may choose to send the same or different PDSCH new MSG2 contents based on UE feedback via (NDI or different HARQ process ID). Even if some component of new MSG2 are ACK'ed, to allow soft combining, the gNB scheduler may still decide to retransmit the whole PDSCH. As an alternative, the gNB can transmit a new PDSCH with a different mix of new MSG2's with NDI flipped.

Still a third option is to send new MSG2 in a unicast way. In other words, the new MSG2 for different UEs are not multiplexed to support per UE ACK/NAK and retransmission.

In this case, PDCCH may be a normal DL grant with its CRC scrambled by RA-RNTI. PDCCH payload may include a UE indication (pointing to an actual UE ID) and RAPID. A hashing function can be defined to map a UE ID to the UE indication field in PDCCH. In this case, HARQ feedback may be naturally supported from NDI/RVID/ARI fields in the DCI. The HARQ process ID may not be needed (and can be replaced by the hashed ID field). Upon decoding the PDCCH with the correct UE indication, the UE may attempt to decode the new MSG2. In this case, there may be a collision issue (different UEs with different UE-ID and RAPID combinations hash to the same UE indication). However, the gNB may be aware of the collision and can withhold the transmission of the later UE's new MSG2 to avoid confusion. The UE may only need to decode one PDSCH with after decoding PDCCH by checking the UE indication field.

For PDSCH, due to the limited space with UE indication in PDCCH, the new MSG2 may still include the actual UE ID to resolve the hashing collision. In this case, only a UE with the successful contention resolution sends ACK on the resource indicated in PDCCH. The UE still cannot send NAK, in case there is a collision, so the UE does not know if the MSG2 is for itself without decoding. In this case, the gNB may retransmit a new MSG2 if it has not detected an ACK from UE.

In some cases, the new 2-step RACH MSG1 may be used for contention free random access (CFRA). In some cases, the new MSG1 may be used at least for CFRA based handover, where the UE needs to send an UL Msg. Conventionally, the UL MSG is sent based on the UL grant issued in MSG2. In this case, it may be beneficial to attach the payload in the new MSG1 even for CFRA. In some cases, the gNB can indicate whether UE sends preamble only or new MSG1 for CFRA.

EXAMPLE EMBODIMENTS

Embodiment 1

A method for wireless communications by a user equipment (UE), comprising initiating a two-step random access (RA) channel procedure (RACH) by sending a first message to a base station, the first message comprising at least a RACH preamble and a payload, receiving a random access response (RAR) message from the base station, wherein the RAR message indicates successful reception, by the base station, of both the RACH preamble and payload if the response message is of a first format, and transitioning to a four-step RACH procedure before successful completion of the two-step RACH procedure if the RAR message is of a second format.

Embodiment 2

The method of Embodiment 1, wherein the RAR message that triggers the transition has a RA preamble identifier (RAPID) field that indicates the base station at least successfully detected the RACH preamble portion of the first message.

Embodiment 3

The method of Embodiment 2, wherein the UE begins the four-step RACH procedure by sending a message with an indication of an identifier (ID) of the UE.

Embodiment 4

The method of any of Embodiments 1-3, wherein the RAR message is broadcast to a plurality of UEs with a same random access radio network temporary identity (RA-RNTI).

Embodiment 5

The method of any of Embodiments 1-4, wherein the RAR message is sent as a unicast message to the UE.

Embodiment 6

The method of any of Embodiments 1-5, wherein the UE is configured with separate transmit power control parameters for the two-step and four-step RACH procedures and the power control parameters comprise at least a preamble received target power and a power ramping step size.

Embodiment 7

The method of any of Embodiments 1-6, wherein the UE initiates the four-step RACH procedure with a transmit power level dependent on a current transmit power level of the two-step RACH procedure prior to the transition.

Embodiment 8

The method of Embodiment 7, wherein the UE initiates the four-step RACH procedure with a transmit power level with additional power ramping relative to the current transmit power level of the two-step RACH procedure prior to the transition.

Embodiment 9

The method of any of Embodiments 1-8, further comprising receiving remaining minimum system information (RMSI) configuring the UE with one or more parameters to support transitioning from the two-step RACH procedure and the four-step RACH procedure.

Embodiment 10

The method of any of Embodiments 1-9, wherein the UE is configured to select between the two-step RACH procedure and the four-step RACH procedure based on a measurement of channel loading or occupancy.

Embodiment 11

The method of any of Embodiments 1-10, wherein the UE applies a power offset to the payload portion of the first message of the two-step RACH procedure.

Embodiment 12

The method of Embodiment 11, wherein the UE applies an additional power offset to the payload portion of the first message when re-transmitted in the four-step RACH procedure.

Embodiment 13

The method of any of Embodiments 1-12, wherein the subcarrier spacings (SCSs) for the preamble and payload portions of the first message of the two-step RACH procedure are configured separately.

Embodiment 14

The method of any of Embodiments 1-13, wherein the UE uses a same subcarrier spacing (SCS) for the preamble and payload portions of the first message of the two-step RACH procedure and the SCS for the preamble and payload portions of the first message of the two-step RACH procedure is indicated separately from an SCS used by the UE for message transmission for the four-step RACH procedure.

Embodiment 15

The method of any of Embodiments 1-14, further comprising receiving signaling indicating that the UE is to include both the payload and the RACH preamble only when sending the first message of the two-step RACH procedure for contention free random access (CFRA).

Embodiment 16

A method for wireless communications by a network entity, comprising receiving at least a random access channel (RACH) preamble in a first message from a user equipment (UE) as part of a two-step RACH procedure and sending a random access response (RAR) message to the UE, wherein a first format of the RAR message indicates successful reception of both the RACH preamble and a payload in the first message and a second format of the RAR message signals the UE to transition to a four-step RACH procedure before successful completion of the two-step RACH procedure.

Embodiment 17

The method of Embodiment 16, wherein the RAR message of the second format that triggers the transition has a RA preamble identifier (RAPID) field that indicates the base station at least successfully detected the RACH preamble portion of the first message.

Embodiment 18

The method of Embodiment 17, wherein the network entity begins the four-step RACH procedure by detecting a message that has an indication of an identifier (ID) of the UE.

Embodiment 19

The method of any of Embodiments 16-18, wherein the RAR message of the second format that triggers the transition is broadcast to a plurality of UEs with a same random access radio network temporary identity (RA-RNTI).

Embodiment 20

The method of any of Embodiments 16-19, wherein the RAR message of the second format that triggers the transition is sent as a unicast message to the UE.

Embodiment 21

The method of any of Embodiments 16-20, wherein the network entity is configured to perform soft-combining of a payload portion of the first message of the two-step RACH procedure to help decode at least a portion of a message the four-step RACH procedure.

Embodiment 22

An apparatus for wireless communications by a user equipment (UE), comprising means for initiating a two-step random access (RA) channel procedure (RACH) by sending a first message to a base station, the first message comprising at least a RACH preamble and a payload, means for receiving a random access response (RAR) message from the base station, wherein the RAR message indicates successful reception, by the base station, of both the RACH preamble and payload if the response message is of a first format, and means for transitioning to a four-step RACH procedure before successful completion of the two-step RACH procedure if the RAR message is of a second format.

Embodiment 23

An apparatus for wireless communications by a network entity, comprising means for receiving at least a random access channel (RACH) preamble in a first message from a user equipment (UE) as part of a two-step RACH procedure and means for sending a random access response (RAR) message to the UE, wherein a first format of the RAR message indicates successful reception of both the RACH preamble and a payload in the first message and a second format of the RAR message signals the UE to transition to a four-step RACH procedure before successful completion of the two-step RACH procedure.

Embodiment 24

A computer readable medium having instructions stored thereon for initiating a two-step random access (RA) channel procedure (RACH) by sending a first message to a base station, the first message comprising at least a RACH preamble and a payload, receiving a random access response (RAR) message from the base station, wherein the RAR message indicates successful reception, by the base station, of both the RACH preamble and payload if the response message is of a first format, and transitioning to a four-step RACH procedure before successful completion of the two-step RACH procedure if the RAR message is of a second format.

Embodiment 25

A computer readable medium having instructions stored thereon for receiving at least a random access channel (RACH) preamble in a first message from a user equipment (UE) as part of a two-step RACH procedure and sending a random access response (RAR) message to the UE, wherein a first format of the RAR message indicates successful reception of both the RACH preamble and a payload in the first message and a second format of the RAR message signals the UE to transition to a four-step RACH procedure before successful completion of the two-step RACH procedure.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
receiving remaining minimum system information (RMSI) configuring the UE with one or more parameters to support transitioning from a two-step random access channel (RACH) procedure to a four-step RACH procedure, wherein the one or more parameters include at least a first reference signal receive power (RSRP) threshold for the two-step RACH procedure and a second RSRP threshold for the four-step RACH procedure different from the first RSRP threshold;
initiating, based on the first RSRP threshold, the two-step random access channel (RACH) procedure including sending a first message to a base station, the first message comprising at least a preamble portion, including a RACH preamble, and a payload portion, including a payload, wherein sending the first message includes applying a power offset to the payload portion of the first message;
receiving a random access response (RAR) message from the base station, wherein the RAR message indicates successful reception, by the base station, of both the RACH preamble and the payload when the response message is of a first format; and
transitioning to the four-step RACH procedure before successful completion of the two-step RACH procedure when the RAR message is of a second format.

2. The method of claim 1, wherein
the RAR message that triggers the transition to the four-step RACH procedure has a random access preamble identifier (RAPID) field that indicates the base station, at least, successfully detected the RACH preamble of the first message.

3. The method of claim 2, wherein:
the UE begins the four-step RACH procedure by sending a message with an indication of an identifier (ID) of the UE.

4. The method of claim 1, wherein the RAR message is broadcast to a plurality of UEs with a same random access radio network temporary identity (RA-RNTI).

5. The method of claim 1, wherein the RAR message is sent as a unicast message to the UE.

6. The method of claim 1, wherein:
the UE is configured with separate transmit power control parameters for the two-step and four-step RACH procedures; and
the power control parameters comprise at least a preamble received target power and a power ramping step size.

7. The method of claim 1, wherein the UE initiates the four-step RACH procedure with a transmit power level dependent on a current transmit power level of the two-step RACH procedure prior to the transition.

8. The method of claim 7, wherein the UE initiates the four-step RACH procedure with a transmit power level with additional power ramping relative to the current transmit power level of the two-step RACH procedure prior to the transition.

9. The method of claim 1, wherein the UE is configured to select between the two-step RACH procedure and the four-step RACH procedure based on a measurement of channel loading or occupancy.

10. The method of claim 1, wherein the UE applies an additional power offset to the payload portion of the first message when re-transmitted in the four-step RACH procedure.

11. The method of claim 1, wherein subcarrier spacings (SCSs) for a preamble portion of the first message and the payload portion of the first message are configured separately.

12. The method of claim 1, wherein:
the UE uses a same subcarrier spacing (SCS) for the preamble portion and the payload portion of the first message of the two-step RACH procedure; and
the SCS for the preamble portion and the payload portion of the first message of the two-step RACH procedure is indicated separately from an SCS used by the UE for message transmission for the four-step RACH procedure.

13. The method of claim 1, further comprising receiving signaling indicating that the UE is to include both the payload and the RACH preamble in the first message only when sending the first message of the two-step RACH procedure for contention free random access (CFRA).

14. A method for wireless communications by a network entity, comprising:
transmitting remaining minimum system information (RMSI) configuring a user equipment (UE) with one or more parameters to support transitioning from a two-step random access channel (RACH) procedure to a four-step RACH procedure, wherein the one or more parameters include at least a first reference signal receive power (RSRP) threshold for the two-step RACH procedure and a second RSRP threshold for the four-step RACH procedure different from the first RSRP threshold;
receiving, based on the first RSRP threshold, a first message from a user equipment (UE) as part of a two-step RACH procedure, the first message comprising at least a random access channel (RACH) preamble; and
sending a random access response (RAR) message to the UE, wherein a first format of the RAR message indicates successful reception of both the RACH preamble and a payload included in a payload portion of the first message and a second format of the RAR message signals the UE to transition to a four-step RACH procedure before successful completion of the two-step RACH procedure, wherein a power offset is applied to the payload portion of the first message.

15. The method of claim 14, wherein:
the RAR message of the second format that triggers the transition has a random access preamble identifier (RAPID) field that indicates the network entity at least successfully detected the RACH preamble of the first message.

16. The method of claim 15, wherein:
the network entity begins the four-step RACH procedure by detecting a message that has an indication of an identifier (ID) of the UE.

17. The method of claim 14, wherein the RAR message of the second format that triggers the transition is broadcast to a plurality of UEs with a same random access radio network temporary identity (RA-RNTI).

18. The method of claim 14, wherein the RAR message of the second format that triggers the transition is sent as a unicast message to the UE.

19. The method of claim 14, wherein the network entity is configured to perform soft-combining of the payload portion of the first message of the two-step RACH procedure to help decode at least a portion of a message the four-step RACH procedure.

20. An apparatus for wireless communications by a user equipment (UE), comprising:
means for receiving remaining minimum system information (RMSI) configuring the UE with one or more parameters to support transitioning from a two-step random access channel (RACH) procedure to a four-step RACH procedure, wherein the one or more parameters include at least a first reference signal receive power (RSRP) threshold for the two-step RACH procedure and a second RSRP threshold for the four-step RACH procedure different from the first RSRP threshold;
means for initiating, based on the first RSRP threshold, a two-step random access channel (RACH) procedure including sending a first message to a base station, the first message comprising at least a preamble portion, including a RACH preamble, and a payload portion, including a payload, wherein the means for initiating comprise means for applying a power offset to the payload portion of the first message of the two-step RACH procedure;
means for receiving a random access response (RAR) message from the base station, wherein the RAR message indicates successful reception, by the base station, of both the RACH preamble and the payload when the response message is of a first format; and
means for transitioning to a four-step RACH procedure before successful completion of the two-step RACH procedure when the RAR message is of a second format.

21. An apparatus for wireless communications by a network entity, comprising:
means for transmitting remaining minimum system information (RMSI) configuring a user equipment (UE) with one or more parameters to support transitioning from a two-step random access channel (RACH) procedure to a four-step RACH procedure, wherein the one or more parameters include at least a first reference signal receive power (RSRP) threshold for the two-step RACH procedure and a second RSRP threshold for the four-step RACH procedure different from the first RSRP threshold;
means for receiving, based on the first RSRP threshold, a first message from a user equipment (UE) as part of a two-step RACH procedure, the first message comprising at least a random access channel (RACH) preamble; and
means for sending a random access response (RAR) message to the UE, wherein a first format of the RAR message indicates successful reception of both the RACH preamble and a payload included in a payload portion of the first message and a second format of the RAR message signals the UE to transition to a four-step RACH procedure before successful completion of the two-step RACH procedure, wherein a power offset is applied to the payload portion of the first message.

22. A non-transitory computer readable medium for wireless communication, comprising:
instructions that, when executed by at least one processor, cause the at least one processor to:
receive remaining minimum system information (RMSI) configuring a UE with one or more parameters to support transitioning from a two-step random access channel (RACH) procedure to a four-step RACH procedure, wherein the one or more parameters include at least a first reference signal receive power (RSRP) threshold for the two-step RACH procedure and a second RSRP threshold for the four-step RACH procedure different from the first RSRP threshold;
initiate, based on the first RSRP threshold, a two-step random access channel (RACH) procedure including sending a first message to a base station, the first message comprising at least a preamble portion, including a RACH preamble, and a payload portion, including a payload, wherein sending the first message includes applying a power offset to the payload portion of the first message;
receive a random access response (RAR) message from the base station, wherein the RAR message indicates successful reception, by the base station, of both the RACH preamble and the payload when the response message is of a first format; and
transition to a four-step RACH procedure before successful completion of the two-step RACH procedure when the RAR message is of a second format.

23. A non-transitory computer readable medium for wireless communication, comprising:
instructions that, when executed by at least one processor, cause the at least one processor to:
transmit remaining minimum system information (RMSI) configuring a user equipment (UE) with one or more parameters to support transitioning from a two-step random access channel (RACH) procedure to a four-step RACH procedure, wherein the one or more parameters include at least a first reference signal receive power (RSRP) threshold for the two-step RACH procedure and a second RSRP threshold for the four-step RACH procedure different from the first RSRP threshold;
receive, based on the first RSRP threshold, a first message from a user equipment (UE) as part of a two-step RACH procedure, the first message comprising at least a random access channel (RACH) preamble; and
send a random access response (RAR) message to the UE, wherein a first format of the RAR message indicates successful reception of both the RACH preamble and a payload included in a payload portion of the first message and a second format of the RAR message signals the UE to transition to a four-step RACH procedure before successful completion of the two-step RACH procedure, wherein a power offset is applied to the payload portion of the first message.

* * * * *